United States Patent [19]

Ettridge

[11] 4,205,877
[45] Jun. 3, 1980

[54] CHILDREN'S RECLINING CAR SEATS

[76] Inventor: John P. Ettridge, 235 Diagonal Rd., Warradale, S.A., Australia, 5046

[21] Appl. No.: 908,581

[22] Filed: May 22, 1978

[30] Foreign Application Priority Data

May 27, 1977 [AU] Australia ............................. PD 0248

[51] Int. Cl.² .............................................. A47C 1/02
[52] U.S. Cl. .................................... 297/321; 297/250; 297/322; 297/342
[58] Field of Search ........ 297/256, 253, 254, 316–318, 297/320–322, 340–343; 248/393–396

[56] References Cited

U.S. PATENT DOCUMENTS

| | | | |
|---|---|---|---|
| 1,640,968 | 8/1927 | Southern | 297/316 |
| 4,058,342 | 11/1977 | Ettridge | 297/321 X |

FOREIGN PATENT DOCUMENTS

| | | | |
|---|---|---|---|
| 476021 | 5/1971 | Australia | 297/342 |
| 564868 | 10/1944 | United Kingdom | 248/395 |

Primary Examiner—James C. Mitchell

[57] ABSTRACT

A child's car seat for sitting on the conventional seat of a vehicle and being retained therein by the vehicle safety belts, the car seat being moveable between a slumbering position and a sitting position by movement of a linkage system operated by a handle, whereby the linkage system incorporates an over center device so that the car seat is securely restrained in its two extreme positions.

7 Claims, 4 Drawing Figures

CHILDREN'S RECLINING CAR SEATS

This invention relates to child car seats to securely restrain a child in an automobile.

BACKGROUND OF INVENTION

With the seating of young children in a vehicle, they need to be supported in an upright or semi-upright position, which can be called a sitting position whilst awake, but as children need to sleep, and frequently fall asleep easily in a motor vehicle, there is a need for the children to be supported in a reclining or semi-reclining position when they are sleeping.

Also during this period of time both in the upright and reclining position, the children should be securely restrained in the vehicle for safety purposes. Australian Patent No. 476021 in the name of the present applicant is directed to one form of child seat structure for attachment to motor vehicle seats, the structure comprising a support frame having a back part and a base part, a seat frame having a back rest portion hinged to a seating portion and the seat frame being moveable forwardly and downwardly in relation to the support frame, latch means between the seat frame and the support frame to hold the seat frame in an upright position, and means guiding the back rest portion of the seat frame on the back part of the support frame, whereby when the seat frame is moved forwardly and downwardly, said seat frame is moved from a substantially upright sitting position to a reclining position.

Assuming that this seat is in the reclining or comfortable seating position, in order to move the seat from the reclining position to the sitting position, one must firstly lift the higher point of the back rest portion and when the seat is in the intermediate position push the seat portion back towards the back rest frame so that the seat is then in the sitting position. In order to move the seat from the upright position to the reclined position, one must move the front of the seat portion forward to an intermediate position, then hold the hard point of the back rest portion and lower the seat portion so that the back rest portion moves to the reclined position.

While this is satisfactory, it is necessary to use both hands in order to move the seat, and this could be rather inconvenient especially when a child is in the seat.

It is therefore an object of this invention to provide an improved child car seat where the seat can be usually moved from one position to the other, and without requiring additional latch means to securely retain the seat in either of its two positions.

SUMMARY OF INVENTION

Thus there is provided according to the invention a child's car seat including a base frame, and a back frame, a seat portion and a back rest portion pivoted to each other, said seat portion being supported above said base frame by supporting links, with said back rest portion attached towards its upper end to said back frame by pivoted link means, whereby the seat portion can move downwardly and forwardly with the back rest portion moving downwardly, and at its lower end also moving forwardly to increase the angle between said seat portion and said back rest portion to form a reclining or sleeping position of child's car seat, characterized by adjustment means including an overcentre link means to move the seat from a sitting to a reclining position and back to the sitting position.

DESCRIPTION OF THE PREFERRED EMBODIMENT

Figure 1:
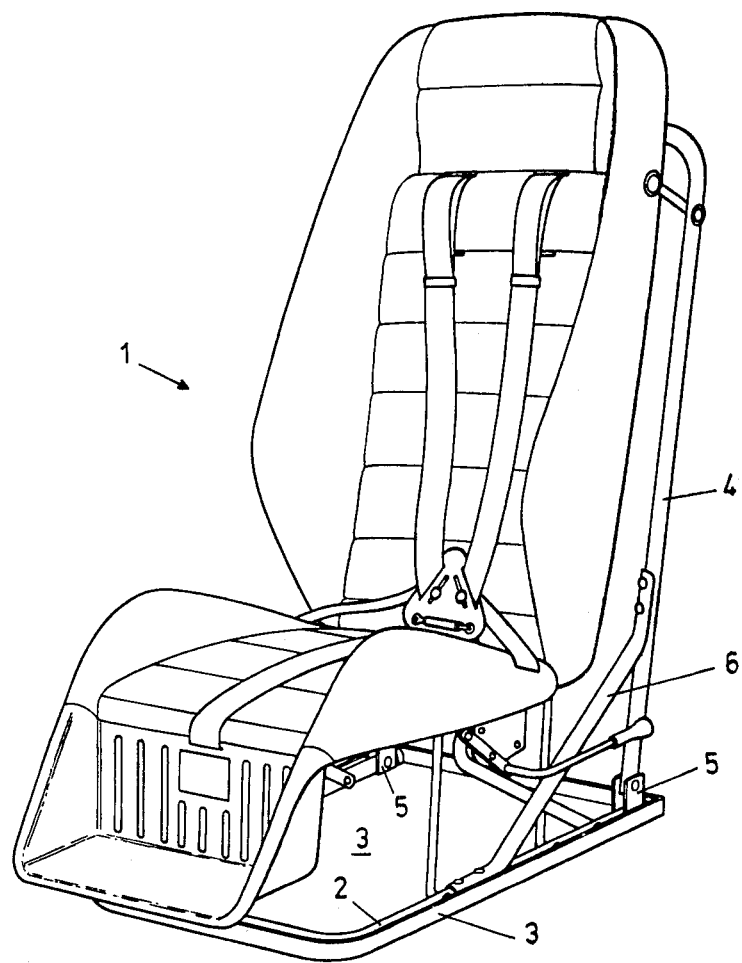
FIG. 1 shows a perspective view of the child's car seat in the sitting position.

The child's car seat 1 comprises a base frame 2 mounted in a base tray 3 whereby the weight of the seat 1 and the child thereon is spread over a wide area with the tray 3 resting on the seat of the vehicle.

The base frame 2 carries a back frame 4 of U shape with its ends mounted in brackets 5 attached to the base frame 3, and being braced by struts 6.

The seat 1 includes a seat portion 7 and a back rest portion 8 pivoted to each other by pins 9. The seat portion 7 supported from the base frame 2 by a pair of U shaped links 10 and 11, with the respective bases of each U shaped link being pivotally mounted to and extending across the seat frame 7, the ends of each of the links 10 and 11 being pivoted to the base frame 2.

The back rest portion 8 of the seat is supported from the back frame 4 by a pair of links 12, one on each side of the seat, and extending from the back rest portion 8 to the back frame 4.

Figure 2:
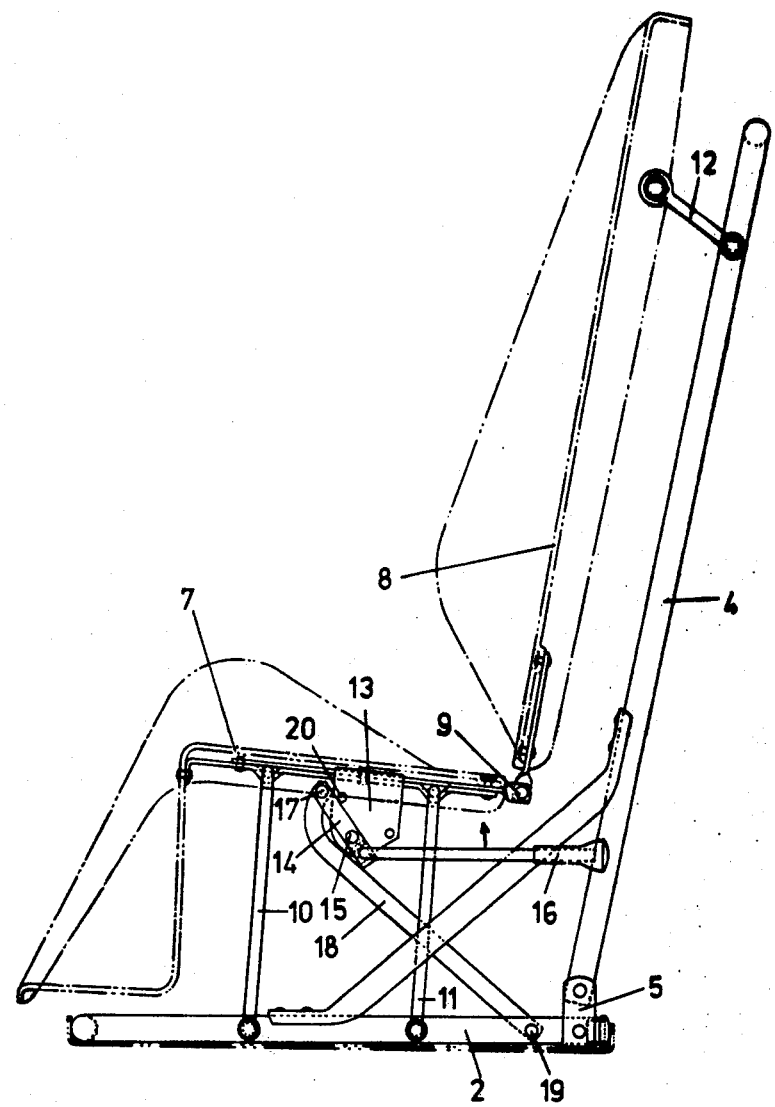
FIG. 2 is a side elevation thereof, various portions being shown dotted in order to move clearly describe and illustrate the invention.
Figure 3:
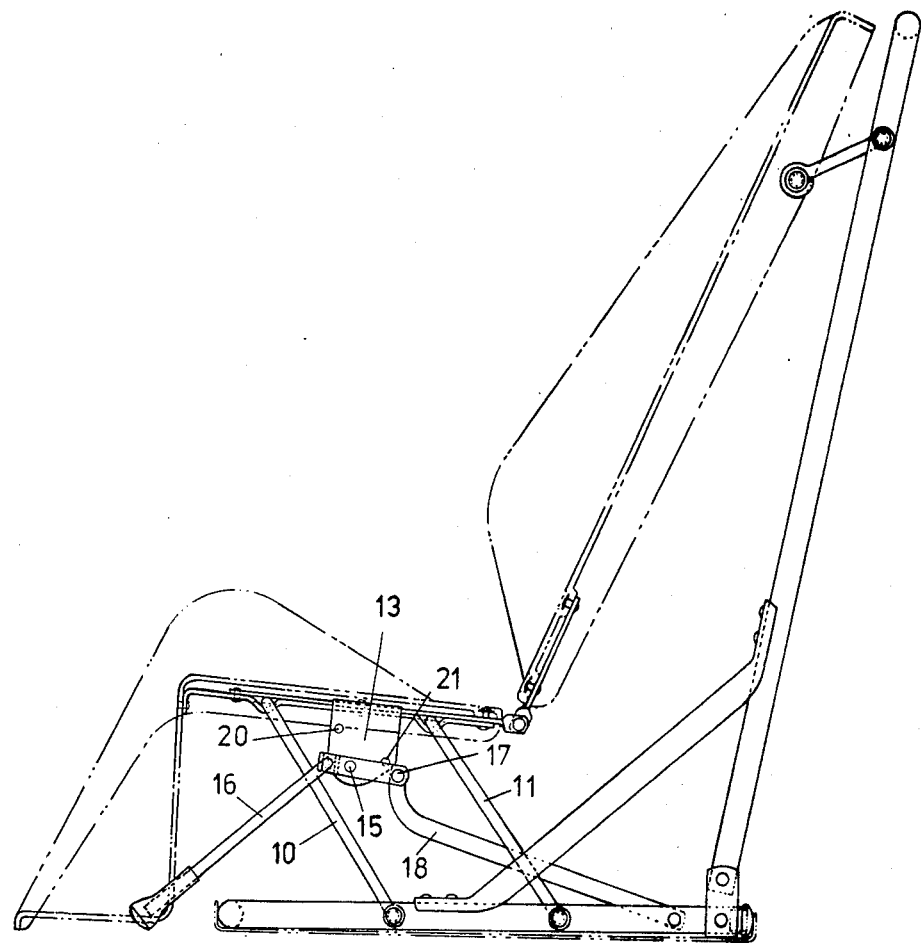
FIG. 3 is a view similar to FIG. 2 but with the seat in the reclining position.
Figure 4:
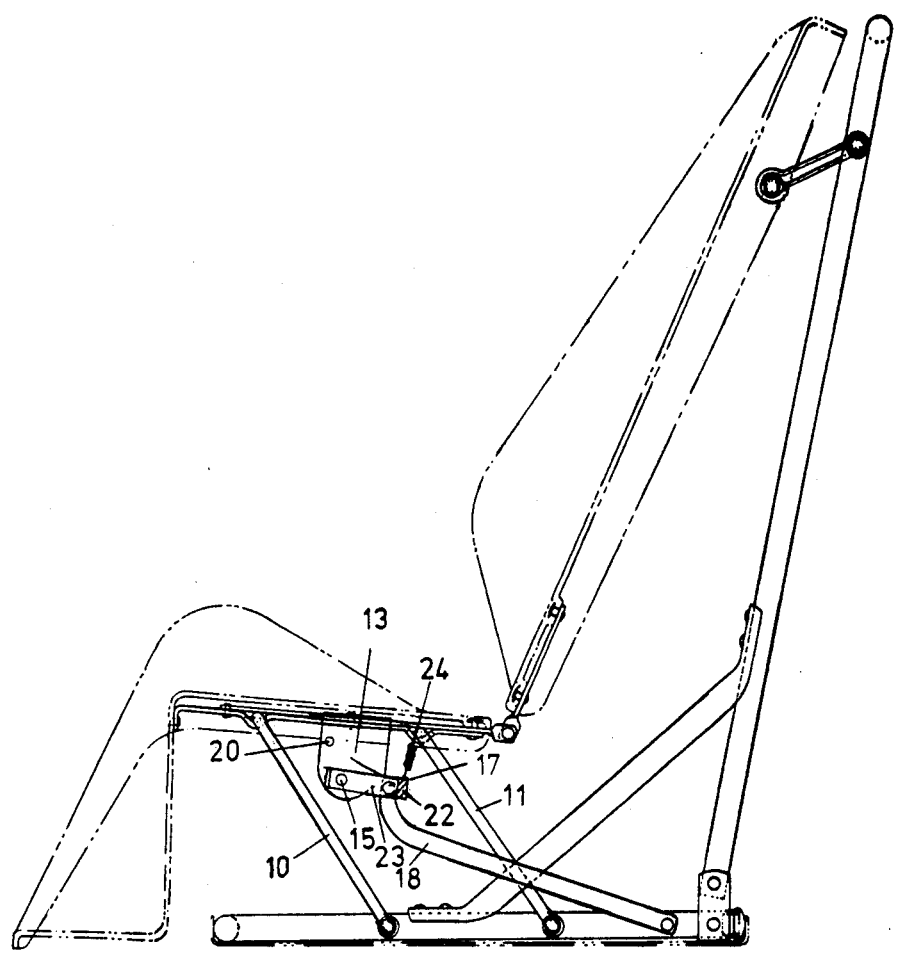
FIG. 4 is a view similar to FIG. 3, but being partially sectioned to more clearly show the invention.

As shown in FIGS. 2 and 3, the seat 1 can be moved from a sitting position (FIG. 2) to a reclining or slumbering position (FIG. 3), linkage means being provided to move the seat between the two positions and retain the seat in these positions.

The seat portion 7 carries on each side a depending bracket 13 having a lever 14 pivoted thereto by being rigidly attached to a pivot pin 15 which is pivotable in the bracket 13. The lever 14 has rigidly attached thereto a handle 16. The lever 14 at its other end has pivots thereto by a pivot pin 17 a control link 18, the control link 18 also being pivoted to the base frame 2 by a pivot 19.

A U shaped connecting link 22 having legs 23 pivoted to each of the pivot pins 15 and pins 17 to extend across underneath the seat frame. In this way both sides are interconnected so that the control links move in unison A spring 24 is attached to the connecting link 22 and to the seat frame, such as link 11, to hold the link 22 in each of the positions at the limits of its movement.

In the position shown in FIG. 2, the linkage positions the seat in the sitting position, it being noted that the pivot pin 17 is overcentre of a line joining the pivot pin 15 and pivot 19. In this position the seat is stable, for the added weight of the child tends to move the lever 14 to engage the stop pin 20.

On moving the handle 16 from the position shown in FIG. 2 over and upward to the position shown in FIG. 3, the pivot pin 17 moves so that the pivot 17 is again passed dead centre with the further movement being stopped by lever 14 engaging stop pin 21.

It will be seen that the seat in moving from the sitting position to the slumber position, that the seat portion moves forwardly and downwardly, and also the back portion moves similarly downwardly pivoting about link 12 with the back portion 8 increasing its slope. Also the seat portion 7 tilts up slightly at the front while moving downwardly and forwardly so that the seat moves into the reclining position.

As shown preferably the links 10 and 11 are U shaped members extending with the base of the U across the base of the seat portion 7, and that there is a bracket 13, lever 14, and control link 18 on each side of the seat. The pivot pin 15 is rigidly attached to the lever 14, so that on actuation of the handle 16 both levers 14 and links 18 on each side of the seat move in unison from one position to the other position.

The child's car seat is thus adapted to sit on the normal seat of the vehicle, and the base tray spreads the pressure on loading over the area of the tray, so that damage does not occur to the car seat.

The seat is secured to the car by use of an adult seat belt which is passed between the steel tubing and the plastic shell over the struts 6. If desired a further webbing strap can be attached to the top of the frame 4 and be attached to the body of the car behind the vehicle seat.

If other forms of belt are used, for example the sash portion could pass upwardly between the back frame and the back rest portion.

The seat portion and the back rest portion can be formed in any desired shape, but preferably can be of moulded construction with padding and suitable covering thereover and also be provided with a foot rest and tray on which the child can rest his feet.

The child is securely restrained in the seat by suitable straps and harness, and this could be of the full harness type having two shoulder straps, a lap strap and a crotch strap which can be controlled by a releasable buckle so that it is easy to place the child in the seat and fasten the straps in order to securely restrain the child.

It is noted that the links 10 and 11 are generally parallel, and in the upright or seating position the links are generally vertical, and then to lower the child to the slumber position the links both tilt forwardly. If desired the links need not be of equal length, but for example the forward or link 10 could be longer than the link 11 in order to give the required slope to the seat.

Although one form of the invention has been described in some detail it is to be realised that the invention is not to be limited to but can include various modifications falling within the spirit and scope of the invention.

I claim:

1. A child's car seat including a base frame and a back frame rigidly connected thereto, a seat portion and a back rest portion pivoted to each other, said seat portion being pivotally supported above said base frame by upwardly extending generally parallel supporting links, link means pivotally attaching said back rest portion near its upper end to said back frame, whereby the parallel supporting links pivot forwardly about their pivot to the base frame so that the seat portion can move downwardly and forwardly with the back rest portion moving downwardly, and at its lower end also moving forwardly to increase the angle between said seat portion and said back rest portion to form a reclining or sleeping position of the child's car seat, characterized by adjustment means including an overcentre link means interconnecting said base frame and said seat portion to move the seat from a sitting to a reclining position and back to the sitting position.

2. A child's car seat as defined in claim 1 wherein the supporting links are a pair of U shaped link members with the base of the U hinged to the seat portion, and the ends of the arms of the U link pivoted to the base frame, the link members being parallel and with the link towards the forward end of the seat longer than the other link to give the seat portion a slope downwards towards the back.

3. A child's car seat as defined in claim 1 wherein the adjustment means comprises on each side a control link pivoted at one end to the base frame and pivoted at its other end to a lever pivoted intermediate its length to a bracket by a pivot pin, a connecting link interconnecting the pivot points of the control links to said lever to cause both control links to move in unison the arrangement being such that on movement of the lever, the pivotal connection of the control link to the lever can pass overcentre whereby the child's car seat is locked in its extreme positions.

4. A child's car seat as defined in claim 3 including a handle attached to said other end of the lever.

5. A child's car seat as defined in claim 1 wherein the pivoted link means connecting said back rest portion to said back frame comprises a link on each side of the frame and moves said back rest portion downwardly and the top thereof rearwardly to the reclining position.

6. A child's car seat as defined in claim 1 wherein the supporting links are a pair of U-shaped link members with the base of the U hinged to the seat portion, and the ends of the arms of the U link pivoted to the base frame, and said adjustment means includes a control present on each side of the car seat and a connecting member extends between and is secured to said controls for unitary movement thereof.

7. A child's car seat as defined in claim 6 including a handle rigidly attached to one of said controls, said controls including a pivotal device, and said handle extends from said pivotal device to provide a leverage to facilitate movement of said pivotal device which is movable over a center position to lock the car seat in its extreme condition.

* * * * *